United States Patent [19]

van Zon

[11] Patent Number: 4,568,456
[45] Date of Patent: Feb. 4, 1986

[54] SEALING FOR AN INSTALLATION FOR PURIFYING LIQUIDS BY MEMBRANE FILTRATION

[75] Inventor: Cornelis van Zon, Zwolle, Netherlands

[73] Assignee: Wafilin B.V., Zwolle, Netherlands

[21] Appl. No.: 530,718

[22] Filed: Sep. 9, 1983

[30] Foreign Application Priority Data

May 26, 1983 [NL] Netherlands .......................... 8301870

[51] Int. Cl.⁴ ............................................ B01D 31/00
[52] U.S. Cl. ................................ 210/321.1; 210/433.2; 210/450
[58] Field of Search ............ 210/456, 450, 446, 321.1, 210/433.2, 323.2

[56] References Cited

U.S. PATENT DOCUMENTS

| | | | |
|---|---|---|---|
| 3,353,678 | 11/1967 | Dragon | 210/450 X |
| 3,542,204 | 11/1970 | Clark | 210/450 X |
| 4,158,629 | 6/1979 | Sawyer | 210/433.2 X |
| 4,167,480 | 9/1979 | Mach | 210/433.2 X |
| 4,461,707 | 7/1984 | Thayer et al. | 210/450 X |

Primary Examiner—Frank Spear
Attorney, Agent, or Firm—Wilkinson, Mawhinney & Theibault

[57] ABSTRACT

This disclosure is directed to a membrane filtration installation having a liquid inlet chamber and a liquid outlet chamber, each of which was a pipe plate and a number of support pipes between the pipe plates. The inner side of the support pipes structurally support a non-woven tube having an inner tubular membrane on its inner side. At each end the membranes with non-woven tubes are accommodated in openings in the pipe plates. Each membrane engages a sealing sleeve which is integral with a flange which cooperates with the pipe plate beside the openings. The flange is provided with a circumferential annular shoulder which clamps and sealingly engages the pipe plate and the lower edge of the wall of a liquid outlet or inlet chamber by means of a nut engaging a shoulder on the liquid chamber and which is screwed on the outer side of a pipe plate. Preferably the flange is provided with an annular rounded shoulder for engaging the lower edge of the liquid inlet or outlet chamber.

4 Claims, 5 Drawing Figures

SEALING FOR AN INSTALLATION FOR PURIFYING LIQUIDS BY MEMBRANE FILTRATION

BACKGROUND OF THE INVENTION

1. Field of the Invention

This invention relates to an installation for purifying liquids by membrane filtration comprising a liquid inlet chamber and a liquid outlet chamber, both comprising a pipe plate, comprising at least one opening leading into a tubular filtration membrane. At least one support pipe for accommodates a fibrous tube with a filtration membrane and a permeate outlet. The end portion of each membrane at its free inner side is surrounded by a tubular sealing sleeve which is integral with a sealing flange extending beside the opening and which co-operates with the surface of the pipe plate and part of a liquid inlet and/or liquid outlet chamber wall.

2. Description of the Prior Art

An installation of this kind for purifying liquids by membrane filtration has been used in the art. In this known installation the liquid inlet and outlet chamber comprise a bottom pipe plate being integral with the wall of the liquid chamber. In order to obtain a good seal the sealing flange extending beside the tubular sealing sleeve(s) and co-operating with the pipe plate, is provided with a tapering circumferential wall portion extending upwardly with respect to the flange and co-operating with the inner wall of the liquid chamber. A sealing ring is disposed in a recess of the tapering circumferential wall portion of the sealing flange for obtaining a good sealing.

The known installation presents the drawback in that the seal between the inner wall of the liquid chamber and the circumferential wall portion of the sealing flange is unreliable, even when a separate sealing ring is provided between the two parts. Moreover, providing a sealing ring of this kind is very laborious.

SUMMARY OF THE INVENTION

It is a main object of the present invention to provide an installation of the aforementioned kind, ensuring a very reliable sealing between the wall of the liquid chamber and the sealing flange.

This object is attained according to the invention in that in an installation for purifying liquids by membrane filtration comprising a liquid inlet chamber and a liquid outlet chamber both of which comprises a pipe plate, wherein the pipe plate comprises at least one opening leading into a tubular filtration membrane and at least one support pipe for accomodating a fibrous tube with a filtration membrane and a permeate outlet, the end portion of each membrane at its free inner side being surrounded by a tubular sealing sleeve bearing a sealing flange.which extends besides the opening and cooperates with the surface of a pipe plate and part of a liquid inlet and/or liquid outlet chamber wall. The pipe plate chosen from a liquid inlet chamber and a liquid outlet chamber and a chamber wall portion of a liquid inlet or liquid outlet chamber cooperates with an annular portion of the sealing flange to both clamp and seal same.

In an embodiment of this kind a nut screwed on screw thread at the outer side of the pipe plate will seal and clamp the chamber wall of the liquid outlet or the liquid inlet chamber as well as the pipe plate against an annular part of the flange so that a reliable sealing is obtained between the liquid outlet or the liquid inlet chamber on the one hand and the inner side of the filtration membrane on the other hand in a very simple manner.

It should be noted that the term annular portion as used in this description is not restricted to a circular portion cut also, includes any polygonal portion such as a triangle or square portion and so on.

In a preferred embodiment the pipe plate of a liquid outlet chamber and/or liquid inlet chamber and a lower edge of a chamber wall portion are clamped and seal an annular shoulder provided upon the flange. In this manner small differences in the thickness of the flange or in its elastic properties are levelled by the shoulder so that an optimum sealing is obtained.

The flange is provided with four schematically disposed sealing sleeves which cooperates with four filtration membranes accommodated in the installation according to the present invention.

Preferably, the side of the shoulder not facing the bottom plate should be rounded.

In a preferred embodiment both sides of the flange are provided with a, rounded shoulder which contributes to an even better seal.

To obtain a well clamped and sealed condition the pipe plate is advantageously provided with an external screw thread and the chamber wall of an annular shoulder, which co-operates with a nut which can be screwed upon the external screw thread of the pipe plate.

This construction contributes to an extremely simple installation and permits an easy exchange of an assembly of filtration membranes accommodated such in an installation.

More particularly, it is preferable that the inner side of the chamber wall has a truncated conical surface starting from the co-operating surface with the sealing flange or, more particularly, starting from the annular shoulder(s) upon the sealing flange, which embodiment contributes to an extremely good flow of liquid to be purified and to be conveyed through the installation.

A cylindrical inner surface of the chamber wall adjoins the upper side of the truncated conical surface and subsequently this cylindrical surface merges into a cylindrical portion with a greater inner diameter.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE DRAWINGS

FIG. 4 is a section of part of a modified embodiment of an installation of FIG. 1; while

DESCRIPTION OF THE PREFERRED EMBODIMENTS

Figure 1:
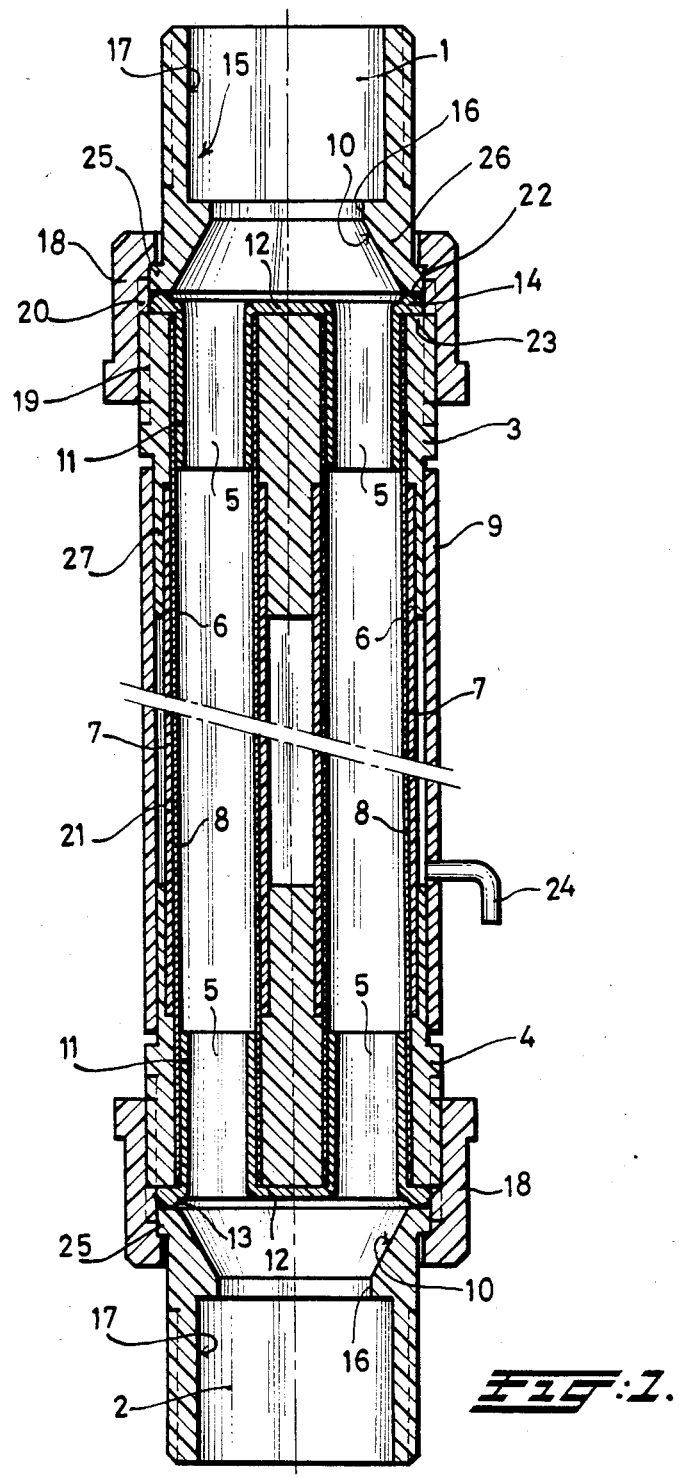
FIG. 1 is a schematic view of an installation according to the invention.
Figure 2:
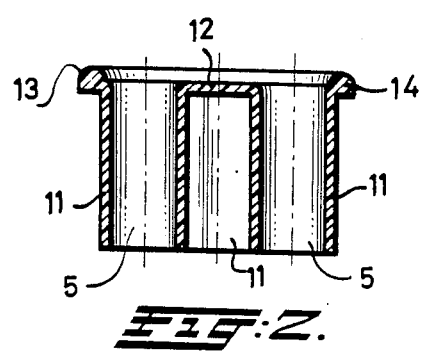
FIG. 2 is a section taken on line II—II.
Figure 3:
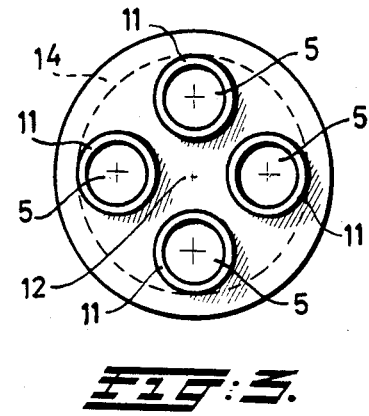
FIG. 3 is a bottom view of FIG. 2.

FIG. 1 illustrates an installation for purifying liquids by membrane filtration. The installation comprises a liquid inlet chamber 1 and a liquid outlet chamber 2. The liquid inlet chamber 1 is provided with a liquid inlet chamber pipe plate 3 while the liquid outlet chamber 2 is provided with a liquid outlet chamber pipe plate 4.

The liquid inlet chamber pipe plate 3 and the liquid outlet chamber pipe plate 4 comprise four tapering openings 5, but is not restricted to this number. The bored openings disclose assemblies of a filtration membrane 6 installed upon a fibrous tube 8, which assemblies 8, 6 are installed between the walls 5 in the liquid inlet chamber plate 3 and the liquid outlet chamber pipe plate 4 upon support tubes 7 which may be of plastic or metal. The support tubes are provided with perforations for discharge of permeate penetrating through the membranes and the fibrous tube. A discharge of the permeate may occur through permeate outlet 24.

The pipe plates 3 and 4 co-operate with a sealing flange 12 which extends beside the tubular sealing sleeves 11 which extend into the openings 5 in the pipe plates, as illustrated in the drawings the circumference of the sealing flange 12 is provided with an annular shoulder 14. The shoulder 14 co-operates with the bottom side 22 of the chamber wall 26 of a liquid inlet or liquid outlet chamber. The lower side of flange 12 situated opposite said shoulder 14 co-operates with the circumferential edge portion of a pipe plate 3 or 4. In order to obtain a good, sealing co-operation, on the one hand between the edge surface 23 of the pipe plate and the flange 12, and on the other hand between the annular shoulder 14 and the lower edge 22 of the chamber wall 26, a nut 18 is provided having as its inner side screw thread 20 engaging screw thread 19 on the outer side of a pipe plate 3 or 4.

The outer side of the chamber wall 26 is provided with an annular shoulder 25 which co-operates with the head part of the nut 18. By screwing nut 18 upon screw thread 19 the lower edge 22 and edge surface 23 are pressed clampingly and sealingly against flange 12 with annular shoulder 14, so that an optimum seal is effected.

A very reliable seal is ensured which may also be rapidly effected as screwing of nut 18 on the screw thread 19 will suffice.

In order to obtain an optimum sealing the inner side 15 of the chamber wall joining the lower edge 22 may preferably merge, through a truncated conical portion 10, into a first cylindrical portion 16 merging subsequently in a step-wise manner into a second cylindrical wall portion 17 having a greater diameter than first cylindrical wall portion 16, acting as a transition.

Shoulder 14 of the flange 12 is provided with a rounding 13.

The installation comprises a casing 9 in which the support tubes 8 are accommodated and which in turn are installed in bushes 27 in a pipe plate.

Figure 4:
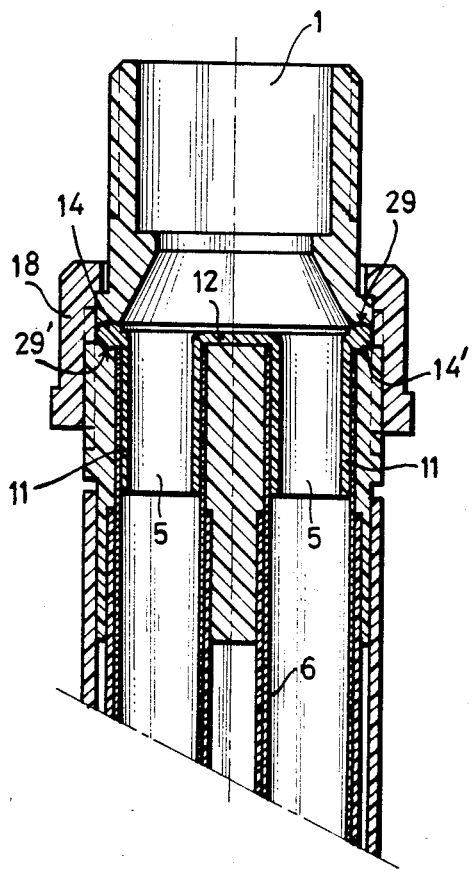

FIG. 4 illustrates a part of a flange 12 at both sides comprising an annular shoulder 14 and 14' each being disposed in an annular groove 29 and 29' in the lower edge 22, pipe plate 3, 4 respectively.

Figure 5:
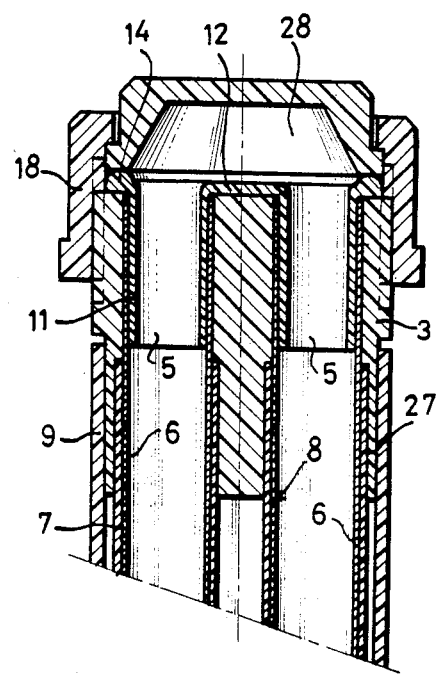
FIG. 5 shows a connection at one end, between two support pipes and using a sealing ring according to the present invention.

Although the foregoing describes a liquid inlet chamber 1 and a liquid outlet chamber 2, two tubular filtration membranes may be interconnected at one end through a connecting chamber 28 whereby use is made of a seal according to the invention, see FIG. 5. A liquid outlet chamber therefore opens at the end into a liquid inlet chamber.

Although the present invention has been shown and described in connection with a preferred embodiment thereof, it will be apparent to those skilled in the art that many variations and modifications may be made without departing from the invention in its broader aspects. It is therefore intended to have the appended claims over all such variations and modifications as fall within the true spirit and scope of the invention.

What is claimed is:

1. An installation for purifying liquids by membrane filtration comprising a casing having a permeate outlet therein, said casing being connected to a liquid inlet chamber (1) and a liquid outlet chamber (2) each comprising a pipe plate (3,4), said pipe plate having at least one opening leading into a tubular filtration membrane, at least one perforated support pipe connected to each said pipe plate for accommodating a fiberous tube having a filtration membrane and a permeate outlet, the end portion of each membrane at its free inner side being surrounded by a tubular sealing sleeve bearing, a sealing flange extending beside said opening and co-operating with the surface of said pipe plate (3,4) and part of the liquid inlet (1) and liquid outlet (2) chamber wall of said casing, said pipe plate (3,4) and a lower edge (22) of a chamber wall portion sealingly and clampingly engage an annular shoulder (14) provided upon said sealing flange (12), and a nut (18) with screw means (19) engaging said liquid inlet (1) or outlet (2) chamber and said pipe plate (3) or (4) and opposite the liquid inlet (1) or outlet (2) chambers.

2. Installation according to claim 1, wherein both the top and bottom portions of the sealing flange form an annular shoulder configuration.

3. Installation according to claim 1, wherein the side of a shoulder upon the sealing flange, not facing the pipe plate is rounded.

4. Installation according to claim 1, wherein the upper side of a truncated conical surface forming an inner side of the chamber wall portion adjoins a first cylindrical inner surface subsequently merging in a stepwise manner, into a second cylindrical portion having a greater inner diameter than the first cylindrical portion.

* * * * *